US007066608B2

United States Patent
Davis et al.

(10) Patent No.: US 7,066,608 B2
(45) Date of Patent: Jun. 27, 2006

(54) LAMP REFLECTOR ASSEMBLY

(75) Inventors: Michael T. Davis, Richardson, TX (US); Chris A. Triska, Dallas, TX (US); John T. McKinley, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 33 days.

(21) Appl. No.: 10/955,380

(22) Filed: Sep. 30, 2004

(65) Prior Publication Data

US 2005/0052625 A1    Mar. 10, 2005

Related U.S. Application Data

(62) Division of application No. 09/998,349, filed on Nov. 30, 2001, now Pat. No. 6,840,633.

(60) Provisional application No. 60/250,522, filed on Nov. 30, 2000.

(51) Int. Cl.
G03B 21/28 (2006.01)
F21V 5/00 (2006.01)
F21V 7/00 (2006.01)
F21V 1/12 (2006.01)
F21V 11/00 (2006.01)

(52) U.S. Cl. ............... 353/98; 353/99; 362/300; 362/350; 362/360; 362/361

(58) Field of Classification Search ............ 353/98–99; 362/300, 350, 560–561, 343
See application file for complete search history.

(56) References Cited

U.S. PATENT DOCUMENTS 2,179,161 A * 11/1939 Anderson et al. ........... 362/302
2,686,255 A    8/1954 Pascucci ...................... 362/337
3,341,731 A *  9/1967 Wilson ........................ 313/113

(Continued)

Primary Examiner—W. B. Perkey
Assistant Examiner—Magda Cruz
(74) Attorney, Agent, or Firm—Charles A. Brill; Wade James Brady, III; Frederick J. Telecky, Jr.

(57) ABSTRACT

A lamp assembly having a reflector (102) holding a lamp element, or burner (104). The reflector (102) typically is an ellipse, with the burner arc positioned at one foci of the ellipse. A reflector extension (108) is designed to mate to the reflector (102). The reflector extension (108) has a first open end toward the reflector (102). The first open end typically is in contact with the reflector (102) to form a seal around the perimeter preventing glass shards from escaping between the reflector (102) and reflector extension (108). Preferably, the reflector extension (108) contacts the reflector (102) around the perimeter of the reflector (102). The second end of the reflector extension (108) also is open to allow the light from the arc to exit the reflector extension (108). A transparent plate (110) placed across this second open end prevents glass from leaving the reflector extension (108). The transparent plate (110) typically is glass, and may have an antireflective coating applied to the plate to limit the light reflected by the plate (110). Two or more ventilation ports (112) in the reflector extension (108) allow cooling airflow into the cavity around the burner (104). These ventilation ports alternatively are a series of small holes or slots in the reflector extension (108).

29 Claims, 2 Drawing Sheets

U.S. PATENT DOCUMENTS

| | | | |
|---|---|---|---|
| 3,806,236 A * | 4/1974 | Downing | 353/97 |
| 4,021,659 A | 5/1977 | Wiley | 362/297 |
| 4,164,012 A | 8/1979 | Gulliksen | 362/282 |
| 4,811,178 A | 3/1989 | Ernst et al. | 362/226 |
| 5,345,140 A | 9/1994 | Holten | 313/113 |
| 5,860,719 A * | 1/1999 | Suzuki et al. | 353/61 |
| 6,244,732 B1 | 6/2001 | Futami et al. | 362/328 |
| 6,418,253 B1 * | 7/2002 | Whitehead | 385/31 |
| 6,527,417 B1 | 3/2003 | Basey | 362/264 |
| 6,771,325 B1 * | 8/2004 | Dewald et al. | 348/743 |

* cited by examiner

LAMP REFLECTOR ASSEMBLY

This application is a Divisional of application Ser. No. 09/998,349, filed Nov. 30, 2001 now U.S. Pat. No. 6,840,633 and Provisional Application No. 60/250,522, filed Nov. 30, 2000.

FIELD OF THE INVENTION

This invention relates to the field of display systems, more particularly to display systems using high pressure lamps, more particularly to reflectors and housings for high pressure lamps.

BACKGROUND OF THE INVENTION

Projection display systems have improved dramatically over the last decade. The color gamut and purity has improved at the same time remarkable improvements in resolution and image brightness have also been made. On top of these changes, the size, weight, and cost of the projectors have fallen dramatically. These improvements have led to entirely new markets for the projectors. For example, mobile professionals are now able to carry their own projectors to presentations to ensure compatibility between their portable computer and the display projector. These portable computers weigh less than three pounds, yet produce excellent images even in relatively bright environments.

In spite of the very small size and weight of the state of the art projectors, consumers desire even smaller and lighter projectors. Producing further reductions in size and weight have been challenging. The optical components are difficult to shrink. Of special concern is the arc lamp. The arc lamp is comprised of two electrodes in a glass ampoule. This glass ample contains a gas that is heated to a plasma by the arcing between the electrodes. A reflector collects the light from the plasma and focuses the light into the aperture of the illumination optics of the display.

Explosion is a common failure mode of arc lamps. The force of the explosion is quite strong, and the glass shards created by the explosion must be contained within the projector. Without containment, the glass shards easily can damage optical components in the projector or become lodged in the other electrical and mechanical components. The glass shards must also be prevented from exiting the projector case. A glass plate, thick enough to stop the glass shards created by the explosion of the lamp, typically is placed over the end of the reflector to contain the explosion. Unfortunately, this glass plate interferes with the air flow intended to cool the arc lamp.

The arc lamp creates a tremendous amount of heat, much of it in long wave infrared energy. The infrared energy cannot pass through the glass plate and creates an unfavorable thermal environment for the arc lamp. Specifically, the excess temperature leads to oxidation of the electrodes and devitrification of the lamp wall materials. Thus, the excess heat reduces the life of the arc lamp. One way to reduce the heat is to enlarge the size of the reflector to increase the space between the arc and the reflector wall. Unfortunately, enlarging the reflector limits how small the projector can be. What is needed is a method of cooling the burner that does not enlarge the size of the projector.

SUMMARY OF THE INVENTION

Objects and advantages will be obvious, and will in part appear hereinafter and will be accomplished by the present invention which provides a method and system for lamp reflector assembly that provides sufficient cooling even for very small reflectors. One embodiment of the claimed invention provides a reflection extension. The reflector extension comprises a reflector extension body and a transparent plate. The reflector extension body has a first open end and a second open end. The reflector body is formed to receive light from a light source in a reflector. The first open end is formed to receive the reflector, and the second open end is arranged to allow the light from the light source to pass through. The transparent plate is positioned to cover the second open end of the reflector extension.

Another embodiment of the present invention provides a lamp assembly. The lamp assembly comprises: an arc lamp, a reflector, a reflector extension, and a transparent plate. The reflector is positioned to capture and reflect light from the arc lamp. The reflector extension has a first open end to receive light from the arc lamp and reflector, and a second open end arranged to allow the light from the arc lamp and reflector to pass through. The transparent plate positioned to cover the second open end of the reflector extension.

Another embodiment of the current invention provides a lamp assembly. The lamp assembly comprises: an arc lamp, a reflector, a tapered reflector extension, and a transparent plate. The reflector is positioned to capture and reflect light from the arc lamp. The tapered reflector extension has a first open end to receive light from the arc lamp and reflector, and a second open end arranged to allow the light from the arc lamp and reflector to pass through. The transparent plate is positioned to cover the second open end of the tapered reflector extension. Together, the reflector, tapered reflector extension, and transparent plate enclose the arc lamp.

Yet another embodiment of the present invention provides a display system. The display system comprises: a lamp assembly, a spatial light modulator, a controller, and a projection lens. The lamp assembly comprises: an arc lamp, a reflector, a tapered reflector extension, and a transparent plate. The reflector is positioned to capture and reflect light from the arc lamp. The tapered reflector extension has a first open end to receive light from the arc lamp and reflector, and a second open end arranged to allow the light from the arc lamp and reflector to pass through. The transparent plate is positioned to cover the second open end of the tapered reflector extension such that the reflector, tapered reflector extension, and transparent plate enclose the arc lamp. The spatial light modulator is in the light path and operable to modulate the light beam according to image data received by the spatial light modulator. The controller provides the image data to the spatial light modulator. The projection lens focuses the modulated light beam onto an image plane. The display system typically includes other components such as illumination relay optics, color filters, and cooling fans.

The disclosed invention improves access for cooling the arc lamp to prolong the life of the lamp and contains lamp explosions without damage to the rest of the display system. The cooling and containment is accomplished using a reflector extension positioned in what is necessarily dead space in the projector. The improved cooling allows the use of smaller lamp reflectors—shrinking the size of the display system.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE PREFERRED EMBODIMENTS

A new lamp assembly has been developed that improves the cooling of the lamp while protecting users of the lamp from explosions, yet allows the use of smaller reflectors and fewer parts to reduce the overall size of the display systems.

Figure 1:
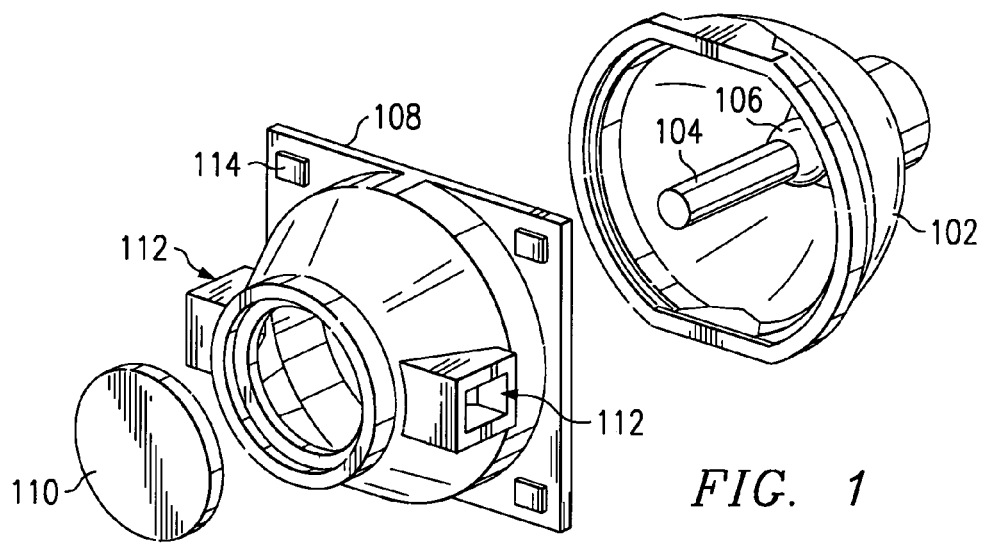
FIG. 1 is an exploded perspective view of a lamp assembly according to the present invention.

FIG. 1 is a cross section perspective view of a lamp assembly according to one embodiment of the present invention. In FIG. 1, a reflector 102 contains the lamp element, or burner 104. The burner has an electrode extending from each end and a chamber 106 in the middle in which the arc and plasma are contained. The reflector 102 typically is an ellipse, with the arc positioned at one foci of the ellipse. An elliptical reflector is preferred since it focuses the light from the arc without requiring a condenser lens.

A reflector extension 108 is designed to mate to the reflector 102. The reflector extension 108 has a first open end toward the reflector 102. The first open end typically is in contact with the reflector 102 to form a seal around the perimeter preventing glass shards from escaping between the reflector 102 and reflector extension 108. Preferably, the reflector extension 108 contacts the reflector 102 around the perimeter of the reflector 102.

The reflector extension 108 need not make contact with the reflector 102 around this perimeter. For example, the first open end of the reflector extension 108 could be larger than the reflector 102, allowing the reflector extension to extend beyond the end of the reflector 102. The overlap between the reflector extension 108 and the reflector 102 provides a baffle to stop glass shards.

The second end of the reflector extension 108 is also open. The second open end allows the light from the arc to exit the reflector extension 108. A transparent plate 110 is placed across this second open end to prevent glass shards from leaving the reflector extension 108. The transparent plate 110 typically is glass, and preferably is a flat glass plate that does not interfere with the light traveling through the reflector extension. The transparent plate 110 may have an antireflective coating applied to the plate to limit the light reflected by the plate 110. The plate may be perpendicular to the axis of the reflector, or tilted at an angle to it.

FIG. 1 also shows two ventilation ports 112 that allow cooling airflow into the cavity around the burner 104. These ventilation ports can also be formed by a series of small holes or slots in the reflector extension 108. The size of the holes or slots preferably are small enough to prevent large glass shards from passing through the holes. When large ventilation ports 112 are used, the flange around the ventilation port stops the glass shards such that the glass leaves the reflector extension 108 at a very low velocity if at all. The openings, whether holes, slots, or ports, typically are designed so that no shard from the chamber 106 can have a direct path outside the lamp assembly. Thus, any shards must collide with the reflector or reflector extension and give up much of their kinetic energy before exiting the lamp assembly.

Figure 2:
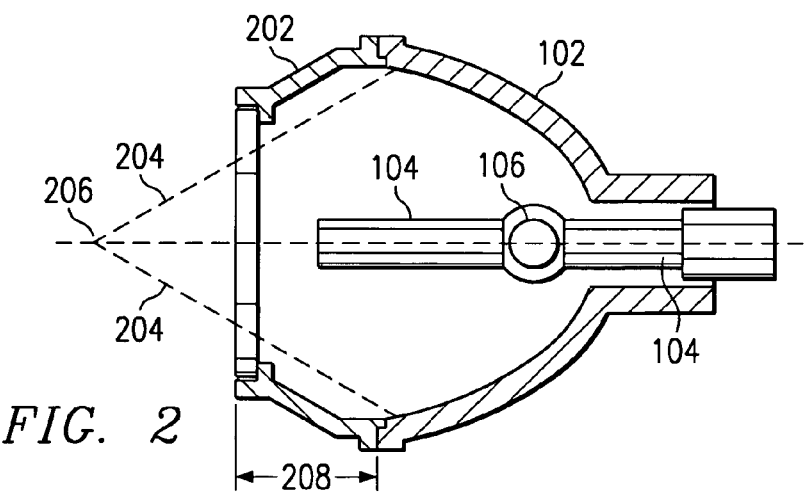
FIG. 2 is a cross section side view of a lamp assembly according to one embodiment of the present invention.

FIG. 2 is a cross section side view of another embodiment of the reflector extension 202. The converging rays of light 204 shown in FIG. 2 illustrate how the reflector 102 focuses the light from the burner 104. These rays converge to a point 206 on the optical axis of the reflector. The next optical component, typically a color wheel or integrating rod, is located at the point of convergence 206.

The conical volume defined by the converging rays must be kept free of any projector components. Therefore, almost all of the volume used by the reflector extension 202 would be dead space in a projector even without the reflector extension 202. FIG. 2 shows a reflector extension 202 having a straight taper to the second open end. The straight taper minimizes the amount of space consumed by the reflector extension 202, and simplifies its construction.

The reflector extension 202 must be long enough to allow the projector to cool the burner 104. If the reflector extension 202 is too short, the volume enclosed by the reflector 102 and reflector extension 204 will not allow proper air circulation. Furthermore, the limited surface of a short extension makes it difficult to provide enough ventilation. A longer reflector extension 202 provides much better control of the temperature inside the reflector. The longer the reflector extension 202, the more air inside the reflector enclosure and the easier it is to add vents to the extension. A longer reflector extension 202 also provides a greater surface area through which to conduct heat away from the burner 104.

Because the reflector extension is tapered, a longer extension requires a smaller transparent plate to cover the second open end. The smaller transparent plate lowers the cost and weight of the system. The smaller transparent plate allows the use of ultraviolet or infrared rejection coatings because the coatings will cost less to form on the smaller surface. Furthermore, because the reflector extension moves the transparent plate near the focal point of the primary reflector, limiting the ability of the transparent plate to reflect energy to a focal point near the burner avoiding a thermal load on the burner due to the reflected light.

Figure 3:
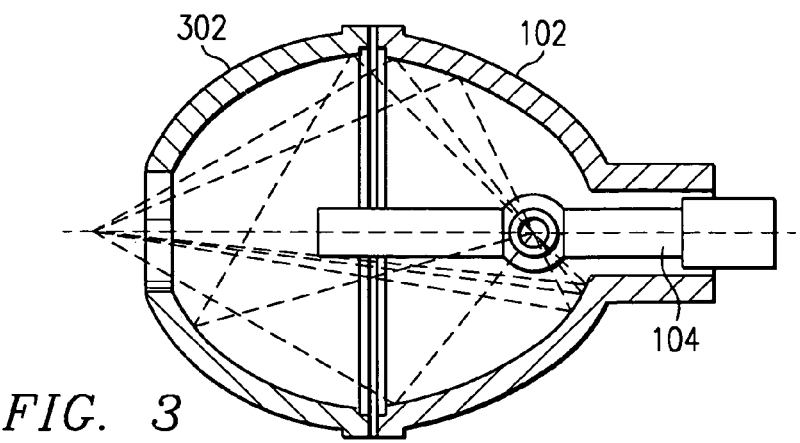
FIG. 3 is a cross section side view of a lamp assembly according to another embodiment of the present invention.

FIG. 3 is a cross section side view of a second embodiment of a reflector extension 302. The reflector extension 302 of FIG. 3 has a curved taper, such as another ellipse. This curved taper is intended to better reflect incident light to the primary reflector 102. The inside of the reflector extension 302 optionally has a reflective coating applied to the inner surfaces. The various shapes and coatings applied to the reflector extensions according to this invention enable the reflector extension to reflect light back to the primary reflector and/or into the aperture of the remaining optical system—typically an integrating rod is the next component in the display system.

One embodiment of a reflector extension 302 with a curved taper places the second focal point at the arc. Light traveling directly from the arc to the reflector extension 302 will reflect from the reflector extension, pass through the first focus point of the reflector extension, and return to the arc. Ideally, after passing through the arc the light will be focused by the primary reflector 102 onto the second focus point of the primary reflector 102 which is the aperture of the remaining optical system.

As with all embodiments described herein, the reflector extension 302 of FIG. 3 can have a complex taper. For example, a reflector extension may use two different tapers, or a curved section and a straight section.

Figure 4:
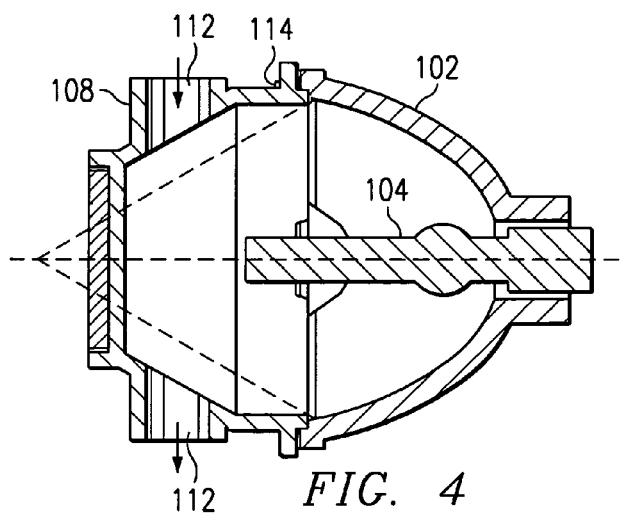
FIG. 4 is a cross section side view of a lamp assembly according to the present invention having optional cooling vents molded into the reflector extension.

FIG. 4 is a cross section side view of the lamp assembly including the reflector extension 108 of FIG. 1. The reflector extension 108 of FIG. 4 has a straight taper and two ventilation ports 112. The reflector extension 108 of FIG. 4 also includes alignment surfaces 114. The alignment surfaces 114 are used to align the reflector extension 108 with the display system chassis. The reflector extension 108 of FIG. 4 uses four alignment surfaces, but the number of alignment surfaces is not critical. For example, three alignment surfaces are all that are needed to define an alignment plane.

Figure 5:
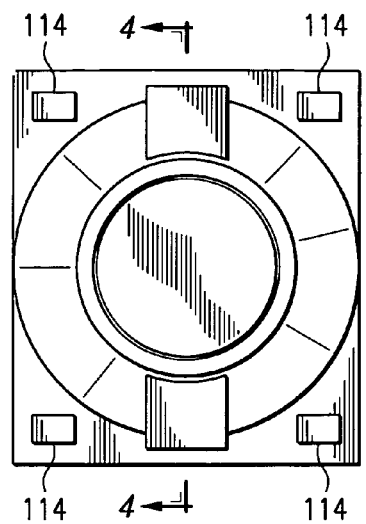
FIG. 5 is an end view of the lamp assembly of FIG. 4 showing controlled surfaces used to align the lamp assembly with the display projector.

FIG. 5 is an end view of the reflector extension 108 of FIG. 4. The location of the four alignment surfaces is clearly shown in FIG. 5. The reflector extension 108 typically is a metal or plastic material that can be formed with more elaborate features compared to glass structures. As mentioned above, these alignment surfaces provide precise registration between the display system chassis and the reflector 102.

The lamp assembly comprising the reflector extension 108, reflector 102, and burner 104 typically are manufactured as a single user replaceable unit. During the assembly of the lamp assembly, the lamp manufacturer joins the reflector 102 and reflector extension 108, which typically have a mechanical means of alignment formed in the reflector 102 and reflector extension 108 to ensure the reflector and reflector extension share the same optical axis. The lip shown in FIG. 4 is one example of a suitable mechanical means of alignment. The alignment means also may be keyed to ensure the reflector and extension are not rotated relative to one another.

After the reflector 102 and reflector extension 108 are assembled, they are held in place using the alignment surfaces 114 while the burner 104 is installed in the reflector 102. The burner 104 is moved within the reflector 102 to place the arc at a first focus point of the reflector. Once aligned, the burner 104 is potted in place to prevent it from moving. Thus, all three components of the lamp assembly are manufactured to be in alignment with the alignment surfaces formed in the reflector extension.

Figure 6:
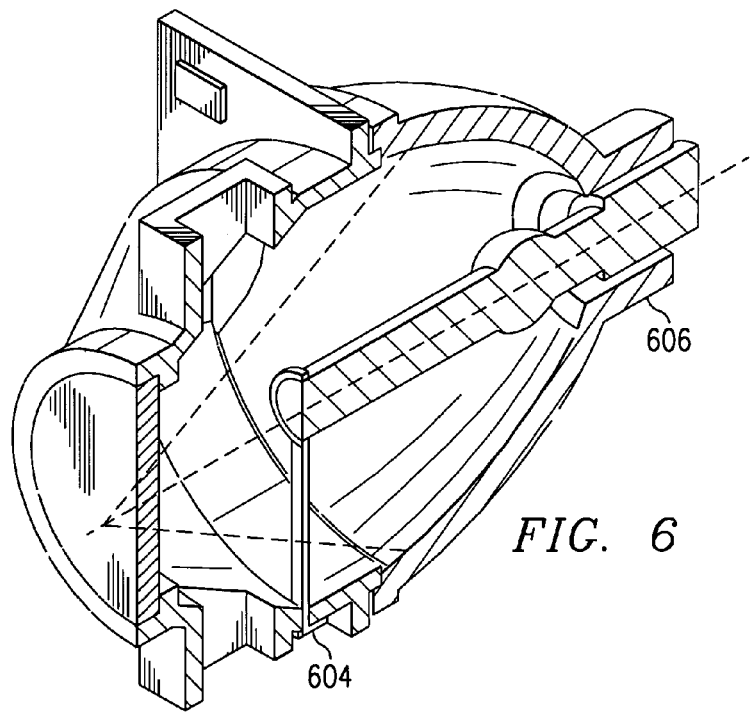
FIG. 6 is a cross section perspective view of a lamp assembly according to the present invention having an optional electrical connection formed in the lamp extension.

FIG. 6 is a cross section perspective view of the lamp assembly showing an optional electrical connection 604 through the reflector extension 602 to one electrode of the burner 104. The other electrode 606 of the burner 104 is connected through the primary reflector 102. As mentioned above, the use of metal or plastic to form the reflector extension allows more intricate molding of the reflector extension and easily accommodates molding in the burner electrical connection.

The various embodiments of the reflector extension described above typically are formed from either plastic or metal. Metal reflector extensions provide the advantage of better thermal conductivity. Plastic reflector extensions provide the advantage of electrical insulation. Multi-shot processes, or separate pieces, can be used to provide a thermally conductive, yet electrically insulative reflector extension.

Figure 7:
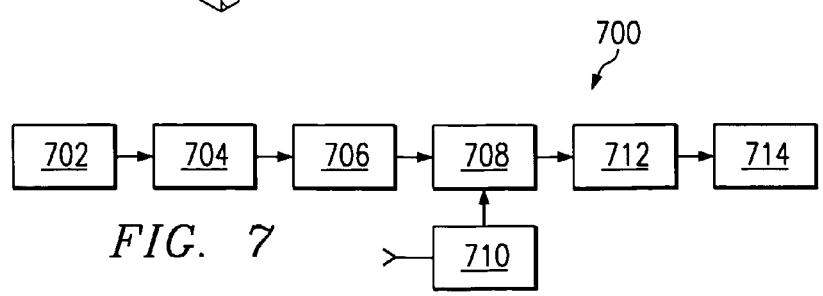
FIG. 7 is a schematic diagram of a display system using the improved lamp assembly of the current invention.

FIG. 7 is a schematic view of an image projection system 700 using an improved lamp assembly 702 according to the present invention. In FIG. 7, light from the lamp assembly 702, as described above, is focused onto a color wheel 704. The color wheel spins to provide sequential primary colored beams of light to an integrator rod 706. The integrator rod 706 homogenizes the light to provide uniform illumination across the entire surface of a spatial light modulator 708. In practice, other relay optics, such as lenses, mirrors, and prisms, are used to gather, control, and focus the light from the lamp assembly onto the spatial light modulator. Likewise, additional mechanical components such as cooling fans or blowers may be used to provide cooling air flow to the lamp assembly, typically through the openings in the reflector extension described above.

optical components The spatial light modulator 708, typically a micromirror or liquid crystal device, spatially modulates the beam of light according to image data provided by a controller 710. The modulated light is then focused by a projection lens 712 onto an image plane 714. Alternatively, a color splitting prism is substituted for the color wheel 704, and three spatial light modulators 708 are used. The color splitting prism separates the white light from the lamp assembly 702 into three primary colored light beams. Each primary colored light beam is modulated by a separate spatial light modulator 708.

Thus, although there has been disclosed to this point a particular embodiment for an improved reflector assembly and method therefore, it is not intended that such specific references be considered as limitations upon the scope of this invention except insofar as set forth in the following claims. Furthermore, having described the invention in connection with certain specific embodiments thereof, it is to be understood that further modifications may now suggest themselves to those skilled in the art, it is intended to cover all such modifications as fall within the scope of the appended claims.

What is claimed is:

1. A lamp assembly comprising:
    an arc lamp;
    a reflector positioned to capture and reflect light from said arc lamp;
    a reflector extension, said reflector extension having a first open end to receive light from said arc lamp and reflector, and a second open end arranged to allow said light from said arc lamp and reflector to pass through; and
    a transparent plate, said transparent plate positioned to cover said second open end of said reflector extension.

2. The lamp assembly of claim 1, wherein said reflector, said reflector extension, and said transparent plate enclose said arc lamp.

3. The lamp assembly of claim 1, whereby said reflector, said reflector extension, and said transparent plate enclose said arc lamp and contain pieces of said arc lamp in the event of an explosion of said arc lamp.

4. The lamp assembly of claim 1, said reflector extension comprising a tapered reflector extension.

5. The lamp assembly of claim 4, said taper being a straight taper.

6. The lamp assembly of claim 4, said taper being a curved taper.

7. The lamp assembly of claim 1, said reflector extension comprising a plastic reflector extension.

8. The lamp assembly of claim 1, said reflector extension comprising a metal reflector extension.

9. The lamp assembly of claim 1, said reflector extension further comprising:
  at least two cooling vents formed in said reflector extension.

10. The lamp assembly of claim 1, said reflector extension further comprising:
  an electrical connection between an exterior surface of said reflector extension and said arc lamp.

11. The lamp assembly of claim 1, said reflector extension comprising at least three distinct alignment surfaces.

12. A lamp assembly comprising:
  an arc lamp;
  a reflector positioned to capture and reflect light from said arc lamp;
  a tapered reflector extension, said tapered reflector extension having a first open end to receive light from said arc lamp and reflector, and a second open end arranged to allow said light from said arc lamp and reflector to pass through; and
  a transparent plate, said transparent plate positioned to cover said second open end of said tapered reflector extension, wherein said reflector, said tapered reflector extension, and said transparent plate enclose said arc lamp.

13. The lamp assembly of claim 12, whereby said reflector, said tapered reflector extension, and said transparent plate enclose said arc lamp and contain pieces of said arc lamp in the event of an explosion of said arc lamp.

14. The lamp assembly of claim 12, said reflector extension further comprising:
  at least two cooling vents formed in said reflector extension.

15. The lamp assembly of claim 12, said reflector extension comprising a tapered reflector extension.

16. The lamp assembly of claim 15, said taper being a straight taper.

17. The lamp assembly of claim 15, said taper being a curved taper.

18. The lamp assembly of claim 12, said reflector extension comprising a plastic reflector extension.

19. The lamp assembly of claim 12, said reflector extension comprising a metal reflector extension.

20. The lamp assembly of claim 12, said reflector extension further comprising:
  an electrical connection between an exterior surface of said reflector extension and said arc lamp.

21. A display system comprising:
  a lamp assembly for providing a light beam along a first path, said lamp assembly comprising:
    an arc lamp;
    a reflector positioned to capture and reflect light from said arc lamp;
    a tapered reflector extension, said tapered reflector extension having a first open end to receive light from said arc lamp and reflector, and a second open end arranged to allow said light from said arc lamp and reflector to pass through; and
    a transparent plate, said transparent plate positioned to cover said second open end of said tapered reflector extension, wherein said reflector, said tapered reflector extension, and said transparent plate enclose said arc lamp;
  at least one spatial light modulator on said light path, said spatial light modulator operable to modulate said light beam according to image data received by said spatial light modulator;
  a controller providing said image data to said spatial light modulator; and
  a projection lens for focusing said modulated light beam onto an image plane.

22. The display system of claim 21, further comprising:
  a color wheel on said light path between said lamp assembly and said spatial light modulator, said color wheel temporally separating said beam of light into at least three sequential primary colored light beams.

23. The display system of claim 21, further comprising:
  an integrator rod on said light path between said lamp assembly and said spatial light modulator, said integrator rod homogenizing said light beam.

24. The display system of claim 21, further comprising:
  an integrator rod on said light path for receiving said light beam from said lamp assembly, said integrator rod homogenizing said light beam; and
  a color wheel on said light path for receiving said light beam from said integrator rod, said color wheel temporally separating said beam of light into at least three sequential primary colored light beams.

25. The display system of claim 21, further comprising:
  a color splitting prism on said light path for receiving said light beam from said lamp assembly, said color splitting prism spatially separating said beam of light into at least three primary colored light beams.

26. The display system of claim 21, further comprising:
  an integrator rod on said light path for receiving said light beam from said lamp assembly, said integrator rod homogenizing said light beam; and
  a color splitting prism on said light path for receiving said light beam from said lamp assembly, said color splitting prism spatially separating said beam of light into at least three primary colored light beams.

27. The display system of claim 21, said tapered reflector extension further having at least two ventilating openings.

28. A display system comprising:
  a lamp assembly for providing a light beam along a first path, said lamp assembly comprising:
    an arc lamp;
    a reflector positioned to capture and reflect light from said arc lamp;
    a tapered reflector extension, said tapered reflector extension having a first open end to receive light from said arc lamp and reflector, a second open end arranged to allow said light from said arc lamp and reflector to pass through, and at least two ventilating openings; and
    a transparent plate, said transparent plate positioned to cover said second open end of said tapered reflector extension, wherein said reflector, said tapered reflector extension, and said transparent plate enclose said arc lamp;
  an integrator rod on said light path operable to receive and homogenize said light beam;
  at least one spatial light modulator on said light path, said spatial light modulator operable to modulate said light beam according to image data received by said spatial light modulator;
  a color wheel on said light path between said lamp assembly and said spatial light modulator, said color wheel temporally separating said beam of light into at least three sequential primary colored light beams;
  a controller providing said image data to said spatial light modulator; and
  a projection lens for focusing said modulated light beam onto an image plane.

29. A display system comprising:

a lamp assembly for providing a light beam along a first path, said lamp assembly comprising:

an arc lamp;

a reflector positioned to capture and reflect light from said arc lamp;

a tapered reflector extension, said tapered reflector extension having a first open end to receive light from said arc lamp and reflector, a second open end arranged to allow said light from said arc lamp and reflector to pass through, and at least two ventilating openings; and a transparent plate, said transparent plate positioned to cover said second open end of said tapered reflector extension, wherein said reflector, said tapered reflector extension, and said transparent plate enclose said arc lamp;

an integrator rod on said light path operable to receive and homogenize said light beam;

a color splitting prism on said light path for receiving said light beam from said lamp assembly, said color splitting prism spatially separating said beam of light into at least three primary colored light beams;

at least three spatial light modulators, each for receiving and modulating one of said primary colored light beams according to image data received by said spatial light modulators;

a controller providing said image data to said spatial light modulators; and a projection lens for focusing said modulated light beam onto an image plane.

* * * * *